D. M. LEWIS.

METHOD OF AND APPARATUS FOR DRAFTING LOCOMOTIVES.

APPLICATION FILED AUG. 7, 1919.

Reissued Mar. 2, 1920.

14,809.

2 SHEETS—SHEET 1.

WITNESS:
Robt. R. Stichel.

INVENTOR
David M. Lewis
BY
Synnestvedt & Lechner
ATTORNEYS.

D. M. LEWIS.

METHOD OF AND APPARATUS FOR DRAFTING LOCOMOTIVES.

APPLICATION FILED AUG. 7, 1919.

Reissued Mar. 2, 1920.

14,809.

2 SHEETS—SHEET 2.

WITNESS:

Robt. R. Kiehel

INVENTOR

David M. Lewis

BY

Symmestedt & Lechner

ATTORNEYS.

UNITED STATES PATENT OFFICE.

DAVID MILLER LEWIS, OF TOPEKA, KANSAS, ASSIGNOR, BY DIRECT AND MESNE ASSIGNMENTS, TO LEWIS DRAFT APPLIANCE CO., OF CHICAGO, ILLINOIS, A CORPORATION OF ILLINOIS.

METHOD OF AND APPARATUS FOR DRAFTING LOCOMOTIVES.

14,809. Specification of Reissued Letters Patent. Reissued Mar. 2, 1920.

Original No. 1,283,239, dated October 29, 1918, Serial No. 87,894, filed March 31, 1916. Application for reissue filed August 7, 1919. Serial No. 315,992.

*To all whom it may concern:*

Be it known that I, DAVID M. LEWIS, a citizen of the United States, residing at Topeka, in the county of Shawnee, State of Kansas, have invented certain new and useful Improvements in Methods of and Apparatus for Drafting Locomotives, of which the following is a specification.

The first of the objects of my present invention is to overcome in a substantial degree the strains upon the tubes or flues and the flue sheet which are incident to the present ordinary or standard design of draft apparatus in which the draft effect of the nozzle is unevenly distributed, as a result of which, with the standard construction, the center flues are generally overworked, that is, carry the major portion of the products of combustion, while the flues at the sides, especially those at the extreme margins, have less draft and are not worked to capacity.

Another object of my present invention is to secure an increase in the boiler capacity and greater efficiency in operation as well as to decrease the fuel consumption required to perform a given amount of work.

Another object of my improved draft appliance is to provide a construction in which for a given amount of total draft action upon a boiler, a larger nozzle opening may be used, resulting in reduced back pressure.

Still another object of my invention is the provision of an improved means for securing accurate adjustment of the nozzle opening.

Another object of my invention is the provision of means for maintaining a more uniform or constant condition of vacuum in the front end and consequently more even and regular draft upon the tubes or flues with the disorders incident to the usual intermittent effect, which disorders are most noticeable at low speeds.

The above, as well as such other objects as may hereinafter appear I attain by means of a construction which I have illustrated in preferred form in the accompanying drawings wherein—

Figure 1:
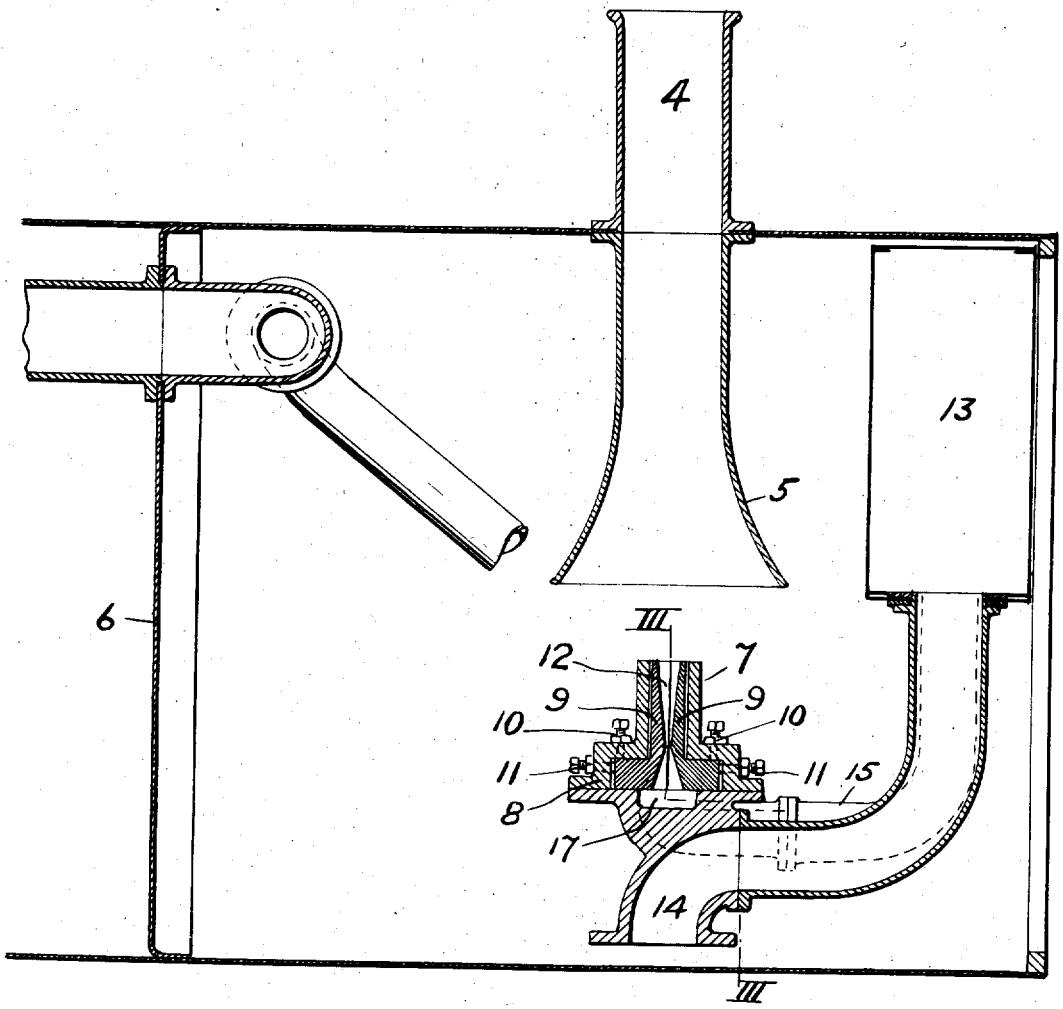
Figure 2:
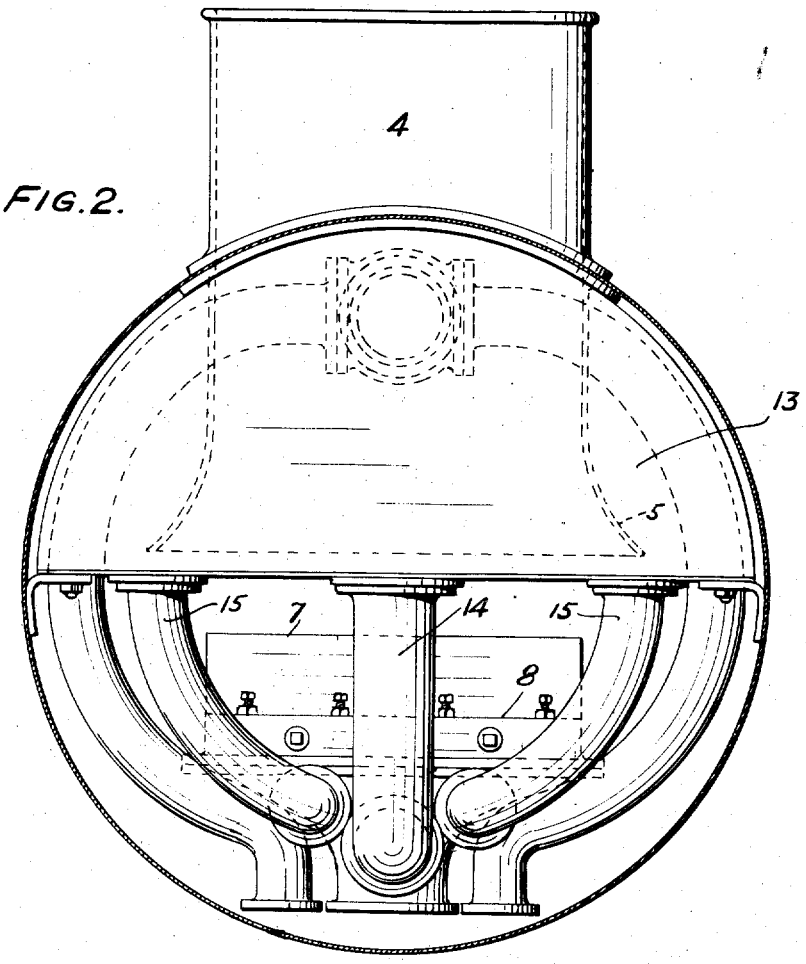
Figure 3:
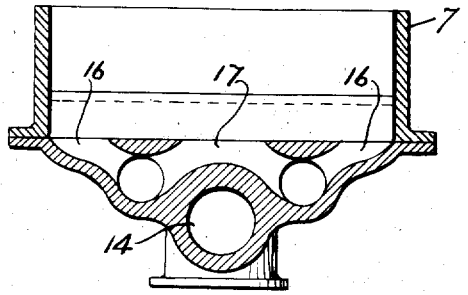

Figure 1 is a longitudinal view showing the front end of a locomotive with my improvements applied thereto; Fig. 2 is an end view of the apparatus shown in Fig. 1, with the front plate of the smoke box removed; and Fig. 3 is a sectional view taken on the line III—III of Fig. 1.

Referring now to Fig. 1, it will be seen that I have therein shown a stack 4 having at its lower end a flared portion 5, the entire stack being substantially rectangular or elongated in section transversely of the smoke box, the width being made to correspond as nearly as possible with the width of the flue sheet indicated at 6.

Below the stack I provide an improved form of nozzle 7 corresponding in general shape with the widened or extended stack and composed primarily of a casing 8 having therein two relatively movable members 9 that are locked in place by set screws 10 and which may be adjusted in position relative to each other to vary the nozzle opening by means of the adjusting screws 11. The slotted aperture forming the nozzle opening between the two members 9 is preferably arranged as shown, of a double wedge shape, the walls of the upper wedge part flaring outwardly as indicated at 12 in order to obtain a spreading effect which will aid in filling the elongated or widened stack. In the forward end of the smoke box I provide an expansion chamber or receiver 13 intended to assist in equalizing the draft effect of the intermittent exhaust discharges from the cylinders, this being accomplished by leading the exhaust steam upward through the passage 14 which discharges near the center of the expansion chamber and connecting the expansion chamber at either side by the pipes 15 to the apertures 16 and 17 in the base of the nozzle casing or box 8.

From the above description it will be seen that with the laterally spread nozzle which I employ, I will secure a draft effect which will be much more evenly spread over the entire width of the flue sheet which will serve to decrease the relative work on the center flues and force the side flues to carry more nearly their proportion of hot gases, thus insuring a more uniform wear upon all the flues and avoiding the necessity so common in present practice of more frequent renewal of the center flues. It will be further apparent from the above description that by the arrangement shown, I have to a considerable extent overcome the difficulties due to the pulsating or intermittent draft so characteristic of the action of the present devices at slow working speeds at which, in some cases, with the ordinary form of nozzle, there is at certain periods of time almost a complete absence of vacuum in the front end which means that between exhausts, that is, four times in each revolution, there is practically no movement of the products of combustion through the flues. The operation just referred to as characteristic of the common construction causes the flues, especially those in the center, to become heated very much higher during the time the blast of the nozzle is effective, the water surrounding them having cooled them substantially in the interval when the vacuum was not operative, the result being that the flues are continually undergoing a rapid expansion and contraction which tends to work them loose in the sheet, resulting in leakage and engine failures.

By carrying the exhaust from the cylinders into the expansion chamber 13 through a large pipe 14 and then allowing the exhaust to reach the nozzle through the two small pipes 15, a more nearly uniform effect of the blast is secured and while upon the initial discharge for any given exhaust there will be of course less forcible expulsion of the steam, the equalization obtained will more than compensate in the beneficial action secured upon the flues. The presence of the expansion chamber 13 will also have the effect of allowing the cylinder pressure to drop more quickly than in the present arrangement where it works against a choked or restricted nozzle. That is to say, by utilizing a large sized pipe 14, the exhaust steam from the cylinders is permitted to flow freely into the expansion chamber from which latter there will be then obtained a more sustained or prolonged and approximately uniform blast. Thus while there will be an intermittent discharge from the cylinders into the receiver, this will take place with greater freedom because of the lesser degree of obstruction and the escape from the receiver will be more continuous and uniform, and the receiver being at all times open to the nozzle, will aid in reducing the cylinder back-pressure even although the nozzle area were to be left substantially the same as in the present standard design. During the interval when the engine valves are closed, the nozzle in my construction will receive pressure discharge from the receiver which will produce the substantially continuous flow referred to.

The receiver or expansion chamber and nozzle in my construction should be so proportioned as to not allow the stack draft to cease entirely even at slow speeds, whereby any tendency there might be for air to work downward through the stack and destroy the vacuum in the front end will be obviated. With the present design, when an engine is moving slowly, the front end is often partly filled by the atmospheric pressure entering the stack between exhausts, which not only destroys the vacuum in the front end and stops the passage of heated gases through the flues, allowing the latter to be unduly cooled by the water, but forces a large proportion of the next exhaust to do useless work in displacing the pressure in the front end before the required vacuum can be recreated. In my construction by the provision of the substantially constant draft above described, I insure that the front end cannot be filled from any place except the fire box which of course produces a steady and efficient draft through the fire box, maintaining a more constant temperature in both the fire box and flues.

Another advantageous result of my extended or widened nozzle and stack is due to the effect upon the fire of more efficient action and better distribution of the heat through the flues. That is to say, by more fully utilizing the capacity of the side tubes or flues, there is obtained a better distribution of the draft upon the fire itself.

That the arrangement above described will secure a marked decrease in fuel consumption as compared with present devices will be evident further from the fact that where the flow of gases, as in the present apparatus, is too rapid in the center flues, there is not sufficient time for proper radiation of the heat to the water. Thus a more constant flow, such as I obtain, without the extreme fluctuations between rapid and no flow, will be much more effective. Furthermore in my arrangement there will be a more efficient effect produced from the side sheets because the greater draft through the side tubes or flues will secure a better fire at the sides of the fire. Another advantage of my arrangement will be that less unburned fuel will be pulled out of the fire box than is the case with present devices in which the heavy draft occurring intermittently during exhaust frequently wastes considerable coal. Still another result will be that in my construction it will not be necessary to carry the fire so deep or thick upon the grates, such objectionable thickness or depth of fire being rendered necessary in the present constructions by the heavy pulsations or fluctuations of the exhaust. It is further to be noted that the large volume stack, the larger nozzle opening, and the expansion chamber produce a draft which may be characterized as a large volume, relatively low pressure, low velocity, substantially continuous draft, approximately uniformly affecting the flue section.

It will of course be understood that my invention is not limited to the precise arrangement shown, and that variations may be made therefrom without departing from the spirit of the invention as herein defined.

I claim:

1. In a locomotive, means for creating a low pressure, large volume draft, comprising in combination an expansion chamber into which steam is conducted, means for discharging the steam at low pressure, low velocity and large volume, and a large volume stack into which said steam is discharged.

2. In a locomotive draft appliance the combination of an expansion chamber into which the exhaust steam from the cylinders is led, means for discharging the steam from the expansion chamber at low pressure, low velocity, and large volume, and a stack into which the steam is discharged, said stack having a volumetric capacity sufficient to freely carry off the steam discharged from the expansion chamber.

3. In a locomotive draft appliance, the combination of a stack of approximately the same width as the flues, an expansion chamber into which the exhaust steam from the cylinders is conducted, and discharge means for discharging steam from the expansion chamber into the stack at low pressure and low velocity.

4. In a locomotive draft appliance, the combination of a stack of approximately the same width as the flues, an expansion chamber into which the exhaust steam from the cylinders is conducted, and discharge means for discharging steam from the expansion chamber into the stack at low pressure and low velocity, said means comprising a discharge opening extending transversely of the smoke box of a width approximating the width of the stack.

5. The method of drafting a locomotive, which consists in changing the intermittent comparatively high pressure, high velocity, and small volume flow of the exhaust steam into a large volume, low velocity, low pressure, and substantially continuous flow or draft, and delivering said steam in such condition to the stack.

6. The method of drafting a locomotive, which consists in changing the intermittent comparatively high pressure, high velocity, and small volume flow of the exhaust steam into a large volume, low velocity, low pressure, and substantially continuous flow or draft, and causing said flow or draft to be substantially uniform over the area of the flue sheet, and delivering said steam in such condition to the stack.

In testimony whereof I have hereunto signed my name.

DAVID MILLER LEWIS.